US012566260B2

(12) United States Patent
Kuchibhotla et al.

(10) Patent No.: US 12,566,260 B2
(45) Date of Patent: Mar. 3, 2026

(54) METHOD AND SYSTEM FOR PHASELESS PASSIVE SYNTHETIC APERTURE RADAR IMAGING

(71) Applicant: Tata Consultancy Services Limited, Mumbai (IN)

(72) Inventors: Aditi Kuchibhotla, Bangalore (IN); Achanna Anil Kumar, Bangalore (IN); Tapas Chakravarty, Kolkata (IN); Kriti Kumar, Bangalore (IN); Angshul Majumdar, New Delhi (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 436 days.

(21) Appl. No.: 18/364,345

(22) Filed: Aug. 2, 2023

(65) Prior Publication Data

US 2024/0077606 A1     Mar. 7, 2024

(30) Foreign Application Priority Data

Aug. 26, 2022    (IN) .............................. 202221048867

(51) Int. Cl.
*G01S 13/90*          (2006.01)
(52) U.S. Cl.
CPC ................................ *G01S 13/9021* (2019.05)
(58) Field of Classification Search
CPC ............... G01S 13/003; G01S 13/9004; G01S 13/9021; G01S 13/9058
See application file for complete search history.

(56) References Cited

U.S. PATENT DOCUMENTS

2021/0132211 A1* 5/2021 McCormick .......... G01S 13/538

FOREIGN PATENT DOCUMENTS

WO      WO2021198407 A1    10/2021

OTHER PUBLICATIONS

Yonel, Bariscan et al., "Deep Learning for Passive Synthetic Aperture Radar", Title of the item: IEEE Journal of Selected Topics in Signal Processing, Date: Feb. 2018, pp. 90-103, Volume-issue Nos. vol. 12, Issue: 1, Publisher: IEEE, Link: https://arxiv.org/pdf/1708. 04682.pdf.

(Continued)

*Primary Examiner* — Timothy A Brainard
(74) *Attorney, Agent, or Firm* — FINNEGAN, HENDERSON, FARABOW, GARRETT & DUNNER LLP

(57)          ABSTRACT

The present invention relates to a method and system for Phaseless Passive Synthetic Aperture Radar (PPSAR) imaging. Existing method for image reconstruction requires large number of measurements for satisfactory PPSAR image reconstruction. However, this leads to provisioning of more on-board storage and/or a high-speed data link between a mobile platform and a ground station. These requirements are undesirable in practice as PPSAR image reconstruction systems are deployed on resource constrained platforms. The present disclosure uses a regularized Wirtinger Flow (rWF) based approach that uses appropriate regularizers to facilitate the PPSAR image reconstruction with fewer measurements. Further the PPSAR image reconstruction is achieved using Alternating Direction Method of Multipliers (ADMM) by employing standard denoisers such as Total Variation (TV), Block-matching and 3D filtering (BM3D) and, Deep Image Prior (DIP). Further the present disclosure considers an actual location of transmitter for PPSAR imaging that yields better image reconstruction.

20 Claims, 7 Drawing Sheets

(56)          References Cited

OTHER PUBLICATIONS

Lee, Seongwook et al., "Compressive Sensing-Based SAR Image Reconstruction from Sparse Radar Sensor Data Acquisition in Automotive FMCW Radar System", Title of the item: RADAR Sensors and Digital Signal Processing, Date: Nov. 1, 2021, Volume-issue Nos. 21(21), Publisher: MDPI, Basel, Switzerland, Link: https://www.mdpi.com/1424-8220/21/21/7283.
Kazemi, Samia et al., "Unrolled Wirtinger Flow with Deep Decoding Priors for Phaseless Imaging", Title of the item: IEEE Transactions on Computational Imaging, Date: Jul. 8, 2022, pp. 609-625, Volume-issue Nos. vol. 8, Publisher: IEEE, Link: https://arxiv.org/abs/2108.01735.
Zhang, Zi-Yao et al., "SAR Image Autofocusing Using Wirtinger Calculus and Cauchy Regularization", Title of the item: ICASSP 2021-2021 IEEE International Conference on Acoustics, Speech and Signal Processing (ICASSP), Date: Jun. 6-11, 2021, Publisher: IEEE, Link: https://arxiv.org/abs/2012.09772.

* cited by examiner

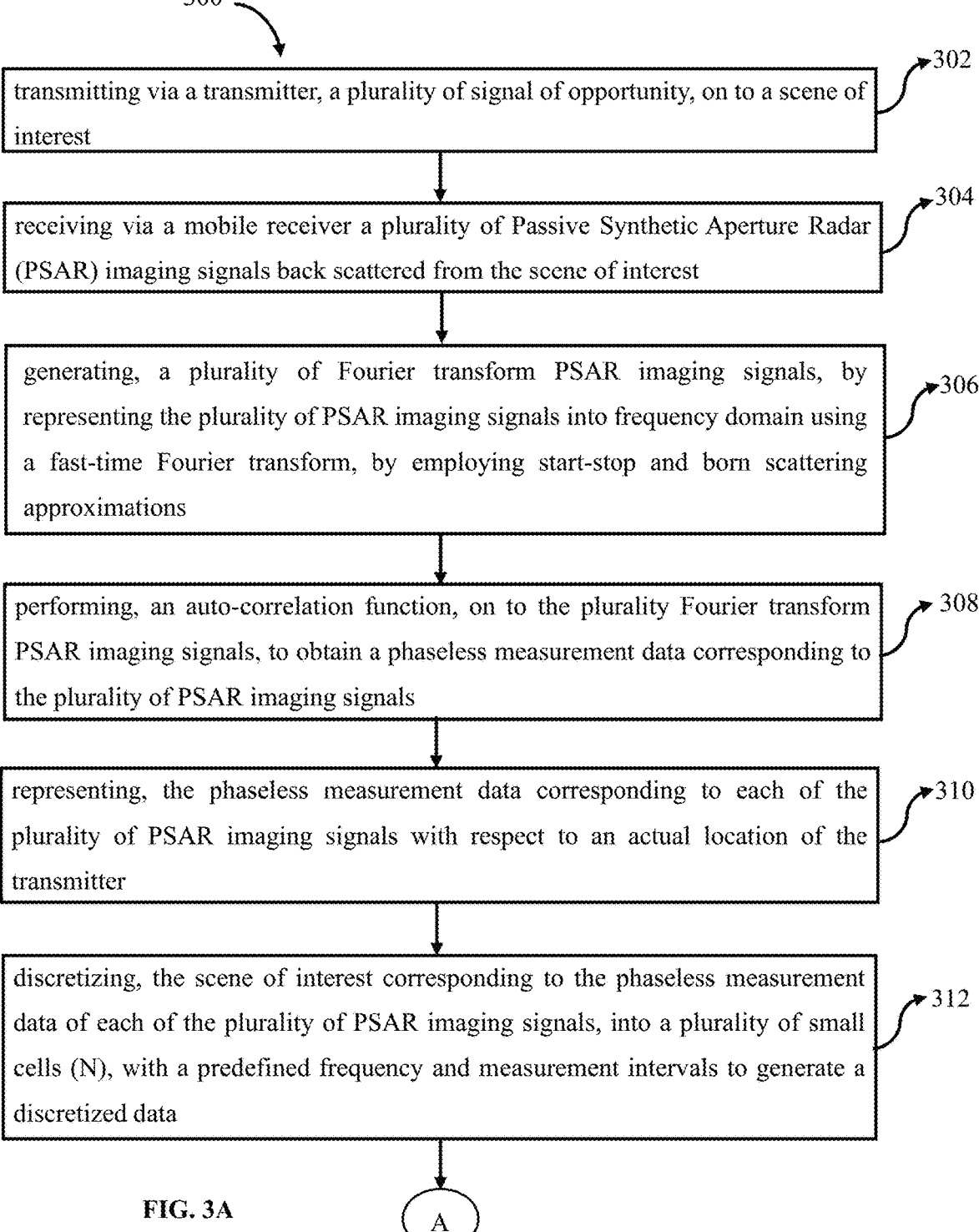

300 transmitting via a transmitter, a plurality of signal of opportunity, on to a scene of interest
302 receiving via a mobile receiver a plurality of Passive Synthetic Aperture Radar (PSAR) imaging signals back scattered from the scene of interest
304 generating, a plurality of Fourier transform PSAR imaging signals, by representing the plurality of PSAR imaging signals into frequency domain using a fast-time Fourier transform, by employing start-stop and born scattering approximations
306 performing, an auto-correlation function, on to the plurality Fourier transform PSAR imaging signals, to obtain a phaseless measurement data corresponding to the plurality of PSAR imaging signals
308 representing, the phaseless measurement data corresponding to each of the plurality of PSAR imaging signals with respect to an actual location of the transmitter
310 discretizing, the scene of interest corresponding to the phaseless measurement data of each of the plurality of PSAR imaging signals, into a plurality of small cells (N), with a predefined frequency and measurement intervals to generate a discretized data
312

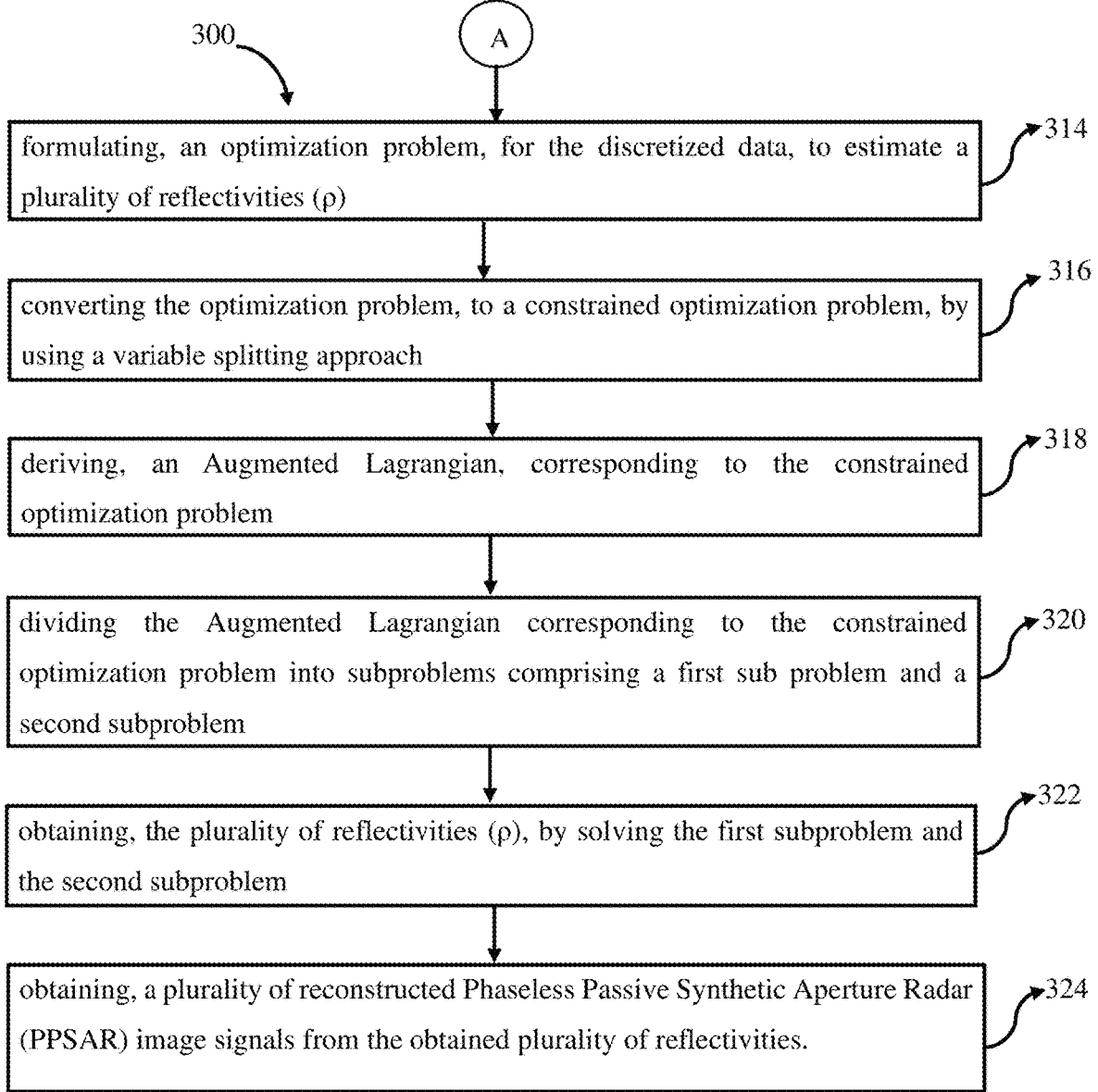

300

Ⓐ formulating, an optimization problem, for the discretized data, to estimate a plurality of reflectivities ($\rho$) — 314 converting the optimization problem, to a constrained optimization problem, by using a variable splitting approach — 316 deriving, an Augmented Lagrangian, corresponding to the constrained optimization problem — 318 dividing the Augmented Lagrangian corresponding to the constrained optimization problem into subproblems comprising a first sub problem and a second subproblem — 320 obtaining, the plurality of reflectivities ($\rho$), by solving the first subproblem and the second subproblem — 322 obtaining, a plurality of reconstructed Phaseless Passive Synthetic Aperture Radar (PPSAR) image signals from the obtained plurality of reflectivities. — 324

FIG. 3B

METHOD AND SYSTEM FOR PHASELESS PASSIVE SYNTHETIC APERTURE RADAR IMAGING

PRIORITY CLAIM

This U.S. patent application claims priority under 35 U.S.C. § 119 to: Indian Provisional Patent Application no. 202221048867, filed on Aug. 26, 2022. The entire contents of the aforementioned application are incorporated herein by reference.

TECHNICAL FIELD

The disclosure herein generally relates to the field of Radio Detection And Ranging (Radar) imaging, and, more particularly, to method and system for Phaseless Passive Synthetic Aperture Radar (PPSAR) imaging.

BACKGROUND

Synthetic Aperture Radar (SAR) imaging is an imaging Radio Detection And Ranging (Radar) system that can obtain high-resolution images by employing signal-processing techniques, while operating in all weather conditions as well as in absence of a light source. Among several SAR imaging modalities, a passive SAR imaging modality that employs signals of opportunity is attracting a tremendous attention at present. The key advantages of employing the passive SAR imaging systems are: (i) reduction in cost, (ii) moderate hardware requirement and, (iii) less burden on already crowded electromagnetic spectrum. Classically, the passive SAR imaging system is achieved by using an interferometric technique with multiple receivers. However, these multiple receivers must be properly synchronized to avoid imaging errors. To overcome this issue of synchronization, a new passive SAR imaging paradigm referred to as Phaseless Passive SAR (PPSAR) imaging is employed that uses only a single receiver.

SUMMARY

Embodiments of the present disclosure present technological improvements as solutions to one or more of the above-mentioned technical problems recognized by the inventors in conventional systems. For example, in one embodiment, a method for Phaseless Passive Synthetic Aperture Radar (PPSAR) imaging is provided. The method includes transmitting via a transmitter a plurality of signal of opportunity on to a scene of interest. A plurality of Passive Synthetic Aperture Radar (PSAR) imaging signals back scattered from the scene of interest are received by a mobile receiver. The method further generates a plurality of Fourier transform PSAR imaging signals by representing the plurality of PSAR imaging signals into frequency domain using a fast-time Fourier transform by employing start-stop and born scattering approximations. The method then performs an auto-correlation function, on to the plurality Fourier transform PSAR imaging signals to obtain a phaseless measurement data corresponding to the plurality of PSAR imaging signals. The method further represents the phaseless measurement data corresponding to each of the plurality of PSAR imaging signals with respect to an actual location of the transmitter. Subsequently the method discretizes the scene of interest corresponding to the phaseless measurement data of each of the plurality of PSAR imaging signals, into a plurality of small cells (N) with a predefined frequency and measurement intervals to generate a discretized data. An optimization problem, for the discretized data is formulated to estimate a plurality of reflectivities ($\rho$). Further the method converts the optimization problem to a constrained optimization problem by using a variable splitting approach. An Augmented Lagrangian is derived corresponding to the constrained optimization problem. The method further divides the Augmented Lagrangian corresponding to the constrained optimization problem into subproblems comprising a first sub problem and a second subproblem. The plurality of reflectivities are obtained by solving the first subproblem and the second subproblem. Furthermore, the method obtains a plurality of reconstructed PSAR image signals from the obtained plurality of reflectivities.

In another aspect, a system for a method for Phaseless Passive Synthetic Aperture Radar (PPSAR) imaging is provided. The system includes: a memory storing instructions; one or more communication interfaces; and one or more hardware processors coupled to the memory via the one or more communication interfaces, wherein the one or more hardware processors are configured by the instructions to: transmit via a transmitter a plurality of signal of opportunity on to a scene of interest. A plurality of Passive Synthetic Aperture Radar (PSAR) imaging signals back scattered from the scene of interest are received via a mobile receiver by configuring the one or more hardware processors. Further the one or more hardware processors are configured to generate a plurality of Fourier transform PSAR imaging signals by representing the plurality of PSAR imaging signals into frequency domain using a fast-time Fourier transform by employing start-stop and born scattering approximations. Consequently, the one or more hardware processors are configured to perform an auto-correlation function, on to the plurality Fourier transform PSAR imaging signals to obtain a phaseless measurement data corresponding to the plurality of PSAR imaging signals. Further the one or more hardware processors are configured to represent the phaseless measurement data corresponding to each of the plurality of PSAR imaging signals with respect to an actual location of the transmitter. Subsequently the one or more hardware processors are configured to discretize the scene of interest corresponding to the phaseless measurement data of each of the plurality of PSAR imaging signals into a plurality of small cells (N) with a predefined frequency and measurement intervals to generate a discretized data. An optimization problem, for the discretized data is formulated to estimate a plurality of reflectivities ($\rho$). Further the one or more hardware processors are configured to convert the optimization problem to a constrained optimization problem by using a variable splitting approach. An Augmented Lagrangian is derived corresponding to the constrained optimization problem. Further the one or more hardware processors are configured to divide the Augmented Lagrangian corresponding to the constrained optimization problem into subproblems comprising a first sub problem and a second subproblem. The plurality of reflectivities are obtained by solving the first subproblem and the second subproblem. Furthermore, the one or more hardware processors are configured to obtain a plurality of reconstructed PSAR image signals from the obtained plurality of reflectivities.

In yet another aspect, there are provided one or more non-transitory machine-readable information storage mediums comprising one or more instructions which when executed by one or more hardware processors cause a method for Phaseless Passive Synthetic Aperture Radar (PPSAR) imaging is provided. The method includes transmitting via a transmitter a plurality of signal of opportunity on to a scene of interest. A plurality of Passive Synthetic Aperture Radar (PSAR) imaging signals back scattered from the scene of interest are received by a mobile receiver. The method further generates a plurality of Fourier transform PSAR imaging signals by representing the plurality of PSAR imaging signals into frequency domain using a fast-time Fourier transform by employing start-stop and born scattering approximations. The method then performs an auto-correlation function, on to the plurality Fourier transform PSAR imaging signals to obtain a phaseless measurement data corresponding to the plurality of PSAR imaging signals. The method further represents the phaseless measurement data corresponding to each of the plurality of PSAR imaging signals with respect to an actual location of the transmitter. Subsequently the method discretizes the scene of interest corresponding to the phaseless measurement data of each of the plurality of PSAR imaging signals, into a plurality of small cells (N) with a predefined frequency and measurement intervals to generate a discretized data. An optimization problem, for the discretized data is formulated to estimate a plurality of reflectivities ($\rho$). Further the method converts the optimization problem to a constrained optimization problem by using a variable splitting approach. An Augmented Lagrangian is derived corresponding to the constrained optimization problem. The method further divides the Augmented Lagrangian corresponding to the constrained optimization problem into sub-problems comprising a first sub problem and a second subproblem. The plurality of reflectivities are obtained by solving the first subproblem and the second subproblem. Furthermore, the method obtains a plurality of reconstructed PSAR image signals from the obtained plurality of reflectivities.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 3A and 3B are flow diagrams illustrating a method for the Phaseless Passive Synthetic Aperture Radar imaging using the system of FIG. 1, in accordance with some embodiments of the present disclosure.

DETAILED DESCRIPTION

Figure 1:
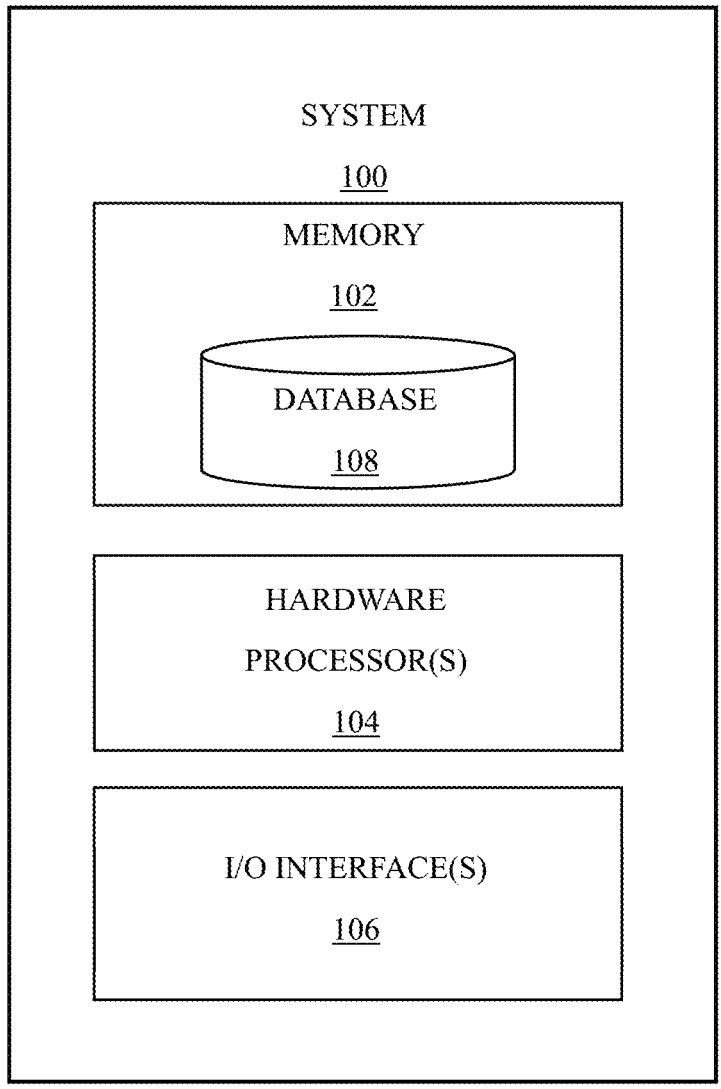
FIG. 1 illustrates an exemplary system for a Phaseless Passive Synthetic Aperture Radar imaging, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following embodiments described herein.

Synthetic Aperture Radar (SAR) imaging is an imaging Radio Detection And Ranging (Radar) system that can obtain high-resolution images by employing signal-processing techniques while operating in all weather conditions as well as in absence of a light source. Among several SAR imaging modalities, a passive SAR imaging modality that employs a signal of opportunity is attracting a tremendous attention at present. As understood by a person skilled in the art the signal of opportunity is that there is no dedicated transmitter for transmitting the signal, rather existing satellite transmissions are used as illumination sources. The key advantages of employing the passive SAR imaging systems are (i) reduction in cost, (ii) moderate hardware requirement and, (iii) less burden on already crowded electromagnetic spectrum. Classically, the passive SAR imaging system as discussed in literature (e.g., "C. E. Yarman and B. Yazici, "Synthetic aperture hitchhiker imaging," IEEE transactions on image processing, vol. 17, no. 11, pp. 2156-2173, 2008."—also referred as Yarman et al.) is achieved by using an interferometric technique with multiple receivers. However, in Yarman et al., the multiple receivers must be properly synchronized to avoid imaging errors. To overcome this issue of synchronization, a new passive SAR imaging paradigm referred to as a Phaseless Passive SAR (PPSAR) imaging is employed that uses only a single receiver.

The PPSAR imaging is an attractive paradigm, but standard SAR reconstruction algorithms are not directly applicable to it due to phaseless measurements. A Low Rank Matrix Recovery (LRMR) based approach in literature (e.g., "E. Mason and B. Yazici, "Passive phaseless sar imaging," in 2018 IEEE Radar Conference (RadarConf18). IEEE, 2018, pp. 0292-0297"—also referred as Mason et al.) employing lifting operation was used for PPSAR image reconstruction. However, the major drawback in "Passive phaseless sar imaging," in 2018 IEEE Radar Conference (RadarConf18). IEEE, 2018, pp. 0292-0297" is that the use of the lifting operation for the PPSAR image reconstruction increases the dimension of the unknown image space, making it computationally demanding and memory intensive. These limitations in the literature, make the LRMR based approach scale poorly and restrict the dimension of an image that need to be reconstructed.

Further a Wirtinger Flow (WF) based approach in literature (e.g., "E. J. Candes, X. Li, and M. Soltanolkotabi, "Phase retrieval via wirtinger flow: Theory and algorithms," IEEE Transactions on Information Theory, vol. 61, no. 4, pp. 1985-2007, 2015"—also referred as Y Candes et al.) is being used as the PPSAR image reconstruction algorithm. Unlike the LRMR based approach, the WF based approach in Candes et al., does not alter the dimension of the image, instead it uses gradient descent for optimization. As understood by a person skilled in the art the WF based approach is a phase retrieval approach based on non-convex optimization as well as a solution algorithm, which has two components: (i) a careful initialization obtained by means of a spectral method and, (ii) a series of updates refining this initial estimate by iteratively applying a novel update rule, much like in a gradient descent scheme. The traditional WF based approach is referred as vanilla Wirtinger Flow (vWF). The vWF based approach provides better PPSAR image reconstruction with reduced computational complexity compared to LRMR based approach. However, vWF based approach requires large number of measurements for the satisfactory PPSAR image reconstruction. In the PPSAR image reconstruction systems, this leads to provisioning of more on-board storage and/or a high-speed data link between a mobile platform and a ground station. These requirements are undesirable in practice as the PPSAR image reconstruction systems are deployed on resource constrained platforms. A possible way to overcome the aforesaid problem is to have better algorithms that use suitable regularizers, that facilitate the PPSAR image reconstruction with fewer measurements. Further a vWF based approach imposing regularization with Generative Prior (GP) in literature ("S. Kazemi, B. Yonel, and B. Yazici, "Unrolled wirtinger flow with deep priors for phaseless imaging," arXiv preprint arXiv:2108.01735, 2021"—also referred as Kazemi et al.) was employed for the purpose. However, the improvement in performance of the vWF based approach imposing regularization with the GP in "Unrolled wirtinger flow with deep priors for phaseless imaging," arXiv preprint arXiv:2108.01735, 2021" is at an expense of the training data requirements.

However, the technical challenge of reducing large volume of training data for the PPSAR image reconstruction with the WF based approach is hardly addressed.

Embodiments herein provide a method and system for a PPSAR image reconstruction with the Wirtinger Flow (WF) based approach in a training-less setting by using: (1) a regularized Wirtinger Flow (rWF) based approach that uses appropriate regularizers to facilitate the PPSAR image reconstruction with fewer measurements, (ii) an Alternating Direction Method of Multipliers (ADMM) as it has been shown to be highly efficient for nonconvex problems and, (iii) a standard denoisers such as Total Variation (TV), Block-matching and 3D filtering (BM3D) and, Deep Image Prior (DIP). As understood by a person skilled in the art the DIP is applied for denoising, where early stopping works as regularization. Results shows improved performance of the proposed rWF based approach with the TV provides 75% reduction in measurements when compared to the literature. In addition, the disclosed rWF based approach is also more robust to PPSAR trajectory errors when compared with the vWF based approach. In the present disclosure the method represents the PPSAR imaging signals with respect to an actual location of a transmitter, that removes far field and small scene approximations on to a scene of interest. The removal of the far field and small scene approximations on the PPSAR imaging signals, removes the conditions on the transmitter and receiver locations, which ultimately remove constraints on dimensions of the scene of interest. By considering the actual location of the transmitter the PPSAR imaging signals yields better image reconstruction.

Referring now to the drawings, and more particularly to FIGS. 1 through 7, where similar reference characters denote corresponding features consistently throughout the figures, there are shown preferred embodiments and these embodiments are described in the context of the following exemplary system and/or method.

FIG. 1 illustrates an exemplary system 100 for PPSAR imaging, in accordance with some embodiments of the present disclosure. In an embodiment, the system 100 may also be referred as PPSAR system. In an embodiment, the system 100 includes one or more processors 104, communication interface device(s) 106 or Input/Output (I/O) interface(s) 106 or user interface 106, and one or more data storage devices or memory 102 operatively coupled to the one or more processors 104. The memory 102 comprises a database 108. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information on transmitted signal, reflecting (or reflected) signal, the signal of opportunity, back scattered signals, transmitter location and ground location. The memory 102 further includes a plurality of modules (not shown), such modules for various technique(s) such as autocorrelation function, Fourier transformation, discretization of the scene of interest, variable splitting approach, Augmented Lagrangian, regularization, Wirtinger Flow and, Alternating Direction of Multipliers Method (ADMM). The memory 102 further comprises modules (not shown) denoiser techniques such as Total Variation (TV), Block-matching and 3D filtering (BM3D) and, Deep Image Prior (DIP). The above-mentioned technique(s) are implemented as at least one of a logically self-contained part of a software program, a self-contained hardware component, and/or, a self-contained hardware component with a logically self-contained part of a software program embedded into each of the hardware component (e.g., hardware processor 104 or memory 102) that when executed perform the method described herein. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis Further, the database 108 stores information pertaining to inputs fed to the system 100 and/or outputs generated by the system (e.g., at each stage), specific to the methodology described herein. Functions of the components of system 100 are explained in conjunction with system architecture diagram depicted FIG. 2, and flow diagrams depicted in FIG. 3A and FIG. 3B for the PPSAR imaging. The method illustrated in FIG. 3A and FIG. 3B. is further explained using results illustrated in FIGS. 4 to 7.

In an embodiment, the system 100 comprises one or more data storage devices or the memory 102 operatively coupled to the processor(s) 104 and is configured to store instructions for execution of steps of the method (300) depicted in FIGS. 3A and 3B by the processor(s) or one or more hardware processors 104. The steps of the method of the present disclosure will now be explained with reference to the components or blocks of the system 100 as depicted in FIG. 1, the system architecture, and the steps of flow diagrams as depicted in FIG. 3A and FIG. 3B. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Figure 2:
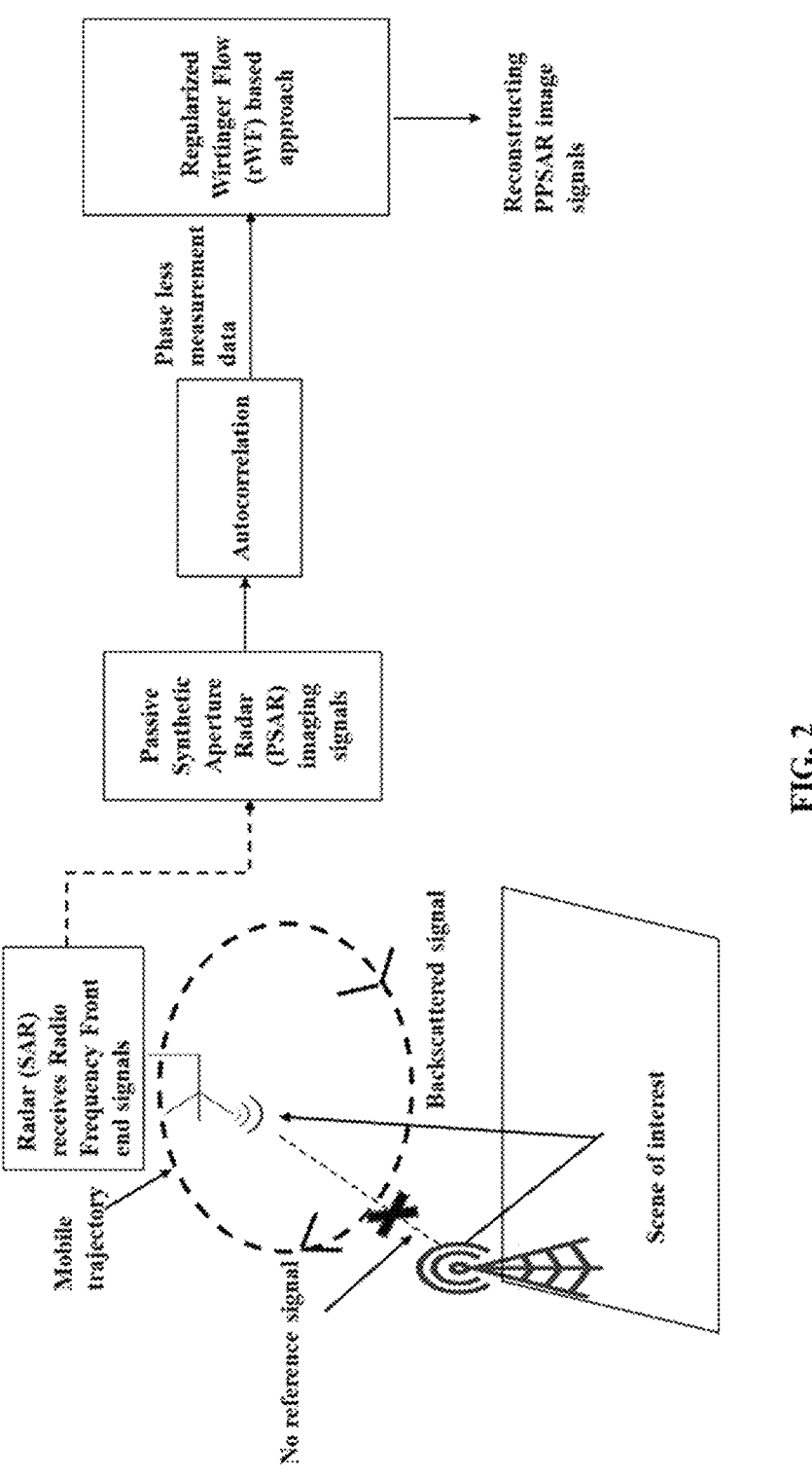
FIG. 2 depicts overview of system architecture, for the Phaseless Passive Synthetic Aperture Radar imaging using the system of FIG. 1, in accordance with some embodiments of the present disclosure.

FIG. 2 depicts overview of system architecture, for the PPSAR imaging using the system of FIG. 1, in accordance with some embodiments of the present disclosure. The transmitter transmits a plurality of signal of opportunity, on to the scene of interest. A plurality of Passive Synthetic Aperture Radar (PSAR) imaging signals are back scattered from the scene of interest over a mobile trajectory that are received by a Synthetic Aperture Radar (SAR), for which reference signal is not required. Further a plurality of Fourier transform PSAR imaging signals are generated from the plurality of PSAR imaging signals using a fast-time Fourier transform. Subsequently, an auto-correlation function is applied on to the plurality Fourier transform PSAR imaging signals to obtain a phaseless measurement data. Finally, a plurality of reconstructed PPSAR image signals are obtained from the phaseless measurement data by using the rWF based approach.

FIG. 3A and FIG. 3B with reference to FIG. 1 and FIG. 2 are flow diagrams illustrating a method 300 for the PPSAR imaging using the system of FIG. 1, in accordance with some embodiments of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, FIG. 2 and the flow diagram illustrated in FIG. 3A and FIG. 3B.

Referring to steps of FIG. 3A, at step 302, the one or more hardware processors 104 transmit, via the transmitter, the plurality of signal of opportunity, on to the scene of interest.

At step 304 of the present disclosure, the method 300 receives, via a mobile receiver controlled by the one or more hardware processors 104, a plurality of Passive Synthetic Aperture Radar (PSAR) imaging signals back scattered from the scene of interest. The plurality of PSAR imaging signals are reflected signals from a plurality of reflecting points over the scene of interest. The mobile receiver trajectory that is moving over the scene of interest is given by:

$$\gamma(s) \in R^3 \tag{1}$$

where s represents a slow-time index that is sampled at a predefined measurement interval; earth surface with x=(x1, x2) is denoted as:

$$X=(x,\psi(x)) \in R^3 \tag{2}$$

where, $\psi(x)$ is a predefined ground topography, a ground reflectivity at any ground location x is denoted by $\rho(x)$ and y represents actual location of the transmitter.

Upon receiving the plurality of PSAR imaging signals back scattered from the scene of interest, at step 306, the one or more hardware processors 104 generate a plurality of Fourier transform PSAR imaging signals by representing the plurality of PSAR imaging signals into frequency domain using a fast-time Fourier transform by employing start-stop and born scattering approximations.

Under the start-stop and born scattering approximations, the received PSAR imaging signal f(ω, s) is expressed as:

$$f(\omega, s) = \int e^{-\frac{i\omega\phi(s,x,y)}{c}} A(\omega, s, x)\rho(x)dx \tag{3}$$

where $\phi(s, x, y)=|y-x|+|x-\gamma(s)|$, A(ω, s, x) is an amplitude function that is based on transmitting and receiving antenna beam pattern, $\gamma(s)$ denotes trajectory of the mobile receiver and, w is a frequency index.

Upon generation of the plurality of Fourier transform PSAR imaging signals, at step 308, the one or more hardware processors 104 perform the auto-correlation function on to the plurality Fourier transform PSAR imaging signals to obtain the phaseless measurement data corresponding to the plurality of PSAR imaging signals. The phaseless measurement data corresponding to the plurality of PSAR imaging signals is referred as a plurality of Phaseless Passive Synthetic Aperture Radar (PPSAR) imaging signals. The phaseless measurement data corresponding to the plurality of PSAR imaging signals is expressed as:

$$d(\omega,s)=f(\omega,s)^*f(\omega,s)=|f(\omega,s)|^2 \tag{4}$$

where $(\cdot)^*$ denotes a complex conjugate and, due to $|\cdot|^2$, the autocorrelation on to the plurality Fourier transform PSAR imaging signals becomes phaseless.

By substituting equation (3) into equation (4), then d(ω, s) can be expressed as:

$$d(\omega, s) = \int\int \rho(x)\rho(\tilde{x})e^{-\frac{i\omega\xi(s,x,\tilde{x},y)}{c}} dxd\tilde{x} \tag{5}$$

where $\xi(s, x, \tilde{x}, y) = |y - x| + |x - \gamma(s)| - |y - \tilde{x}| - |\tilde{x} - \gamma(s)|$.

In literature (e.g., "I.-Y. Son, H. C. Yanik et al., "Doppler synthetic aperture radar interferometry: a novel sar interferometry for height mapping using ultra-narrowband waveforms," Inverse Problems, vol. 34, no. 5, p. 055003, 2018"—also referred as Son et al.) with far field and small scene approximations is approximated as: $|y-x|-|y-\tilde{x}| \approx \hat{y}$.

($\tilde{x}$–x). However, the far field and small scene approximations in literature will put constraints on the dimensions of the scene of interest, that imposes conditions on the transmitter and the receiver location.

At step 310, the one or more hardware processors 104 represent, the phaseless measurement data corresponding to each of the plurality of PSAR imaging signals with respect to the actual location of the transmitter. Using the far field and small scene approximations in the works in literature, equation (5) is expressed as:

$$d(\omega,s)=\int\rho(x)e^{-i\omega(|x-\gamma(s)|-\hat{y}\cdot x)/c}dx\times$$
$$\int\rho(\tilde{x})e^{-i\omega(|\tilde{x}-\gamma(s)|-\hat{y}\cdot x)/c}dx \qquad (6)$$

d($\omega$, s) in literature depend only on the unit vector $\hat{y}$ and not on the actual location (y) of the transmitter. However, these far field and small scene approximations in the literature put constraints on the dimensions of the scene of interest, that imposes conditions on the transmitter and the receiver location. The present disclosure removes the far field and small scene approximations on the phaseless measurement data corresponding to each of the plurality of PSAR imaging signals by using the actual location of the transmitter. The removal of the far field and small scene approximations on the phaseless measurement data corresponding to each of the plurality of PSAR imaging signals, removes the conditions on the transmitter and the receiver locations will ultimately remove the constraints on the dimensions of the scene of interest. By considering the actual location of the transmitter the phaseless measurement data corresponding to each of the plurality of PSAR imaging signals becomes exact. The phaseless measurement data corresponding to each of the plurality of PSAR imaging signals represented with respect to the actual location of the transmitter is mathematically represented as:

$$d(\omega,s)=\int\rho(x)e^{-i\omega(|y-x|+|x-\gamma|)/c}dx\times\int\rho(\tilde{x})e^{i\omega(|y-\tilde{x}|+|\tilde{x}-\gamma|)/c}d\tilde{x} \qquad (7)$$

where x, $\tilde{x}$ are ground locations and y is the transmitter location;

$\rho$(x) is a ground reflectivity at any ground location x;

$\rho$($\tilde{x}$) is a ground reflectivity at any ground location $\tilde{x}$;

c denotes propagation velocity of light;

$\omega$ is the frequency index; and s represents the slow-time index.

At step 312 of the present disclosure, the one or more hardware processors 104 discretize, the scene of interest corresponding to the phaseless measurement data of each of the plurality of PSAR imaging signals, into a plurality of small cells (N), with a predefined frequency and measurement intervals, to generate a discretized data. A $m^{th}$ sampled measurement d m corresponding to ($\omega$, s) m, m=1, 2, . . . , M is expressed as:

$$d_m=|L_m\rho|^2=L_m{}^H\rho\rho^H L_m \qquad (8)$$

where $\rho\in R^N$ and the $n^{th}$ element of $\rho$, i.e., $\rho_n=\rho(x_n)$ and $L_m\in \mathbb{C}^N$, whose $n^{th}$ element in matrix form is given as:

$$[L_m]^n=e^{-i\omega(|x_n-\gamma(s)|-\hat{y}\cdot x_n)/c}|(\omega,s)_m \qquad (9)$$

where for a given $x_n$ and ($\omega$, s)$_m$, $L_m$ is a vector that is calculated by estimating a plurality of reflectivities $\rho$, knowing the sampled measurements $d_m$.

Referring to steps of FIG. 3B, at step 314, the one or more hardware processors 104 formulate, an optimization problem, for the discretized data, to estimate the plurality of reflectivities ($\rho$). The optimization problem for the discretized data, is formulated with a regularized Wirtinger Flow (rWF) based approach, to estimate the $\rho$, and is mathematically represented as:

$$\hat{\rho}=\text{argmin } D(\rho)+\lambda R(\rho) \qquad (10)$$

where D($\rho$) is a data-fidelity term that is represented as a simple quadratic loss function;

R($\rho$) represents the rWF regularization term;

$\lambda$ is a hyper-parameter that controls amount of regularization;

$\hat{\rho}$ is an optimal solution of the optimization problem;

D($\rho$) in the optimization problem, is computed, by using vWF based approach as in ("Passive phaseless sar imaging," in 2018 IEEE Radar Conference (RadarConf18). IEEE, 2018, pp. 0292-0297"), as a simple quadratic loss function.

The computation of D($\rho$)) is mathematically represented as:

$$D(\rho) = \frac{1}{2M}\sum_{m=1}^{M}\left\|L_m^H\rho\rho^H L_m - d_m\right\|_2^2(vWF) \qquad (11)$$

In well-known work in the literature, p is estimated by minimizing only the D($\rho$), without any regularization term R($\rho$), and is solved using a gradient descent algorithm with Wirtinger derivatives as described in literature ("E. J. Candes, X. Li, and M. Soltanolkotabi, "Phase retrieval via wirtinger flow: Theory and algorithms," IEEE Transactions on Information Theory, vol. 61, no. 4, pp. 1985-2007, 2015"). The use of the regularization term in the optimization problem limits the search space for the optimal p, that keeps data-fidelity term D($\rho$) error low. The present disclosure R($\rho$) helps in the PPSAR image reconstruction with fewer measurements compared to methods in "Passive phaseless sar imaging," in 2018 IEEE Radar Conference (RadarConf18). IEEE, 2018, pp. 0292-0297", and "Unrolled wirtinger flow with deep priors for phaseless imaging," arXiv preprint arXiv:2108.01735, 2021". Further the regularization term in the optimization problem helps in removing the trajectory errors.

At step 316, the one or more hardware processors 104 convert, the optimization problem to a constrained optimization problem, by using variable splitting approach. The constrained optimization problem that introduces a proxy variable v, is mathematically represented as:

$$\{\hat{\rho}, \hat{v}\} = \underset{\rho,v}{\text{argmin}}D(\rho) + \lambda R(v) \text{ subject to } \rho = v \qquad (12)$$

At step 318, the one or more hardware processors 104 derive, an Augmented Lagrangian, corresponding to the constrained optimization problem. The augmented Lagrangian corresponding to the constrained optimization problem (equation 12) is represented as:

$$L(\rho, v, u) = D(\rho) + \lambda R(v) + u^T(\rho - v) + \frac{\mu}{2}\|\rho - v\|_2^2 \qquad (13)$$

where $\mu$ is a penalty parameter, u represents a Lagrangian parameter and, $u^T$ represents transpose of $\mu$.

At step 320, the one or more hardware processors 104 divide, the Augmented Lagrangian corresponding to the constrained optimization problem as a first subproblem and a second sub problem. The Augmented Lagrangian corresponding to the constrained optimization problem, divided into subproblems as the first sub problem and the second sub problem, are iteratively solved to calculate a saddle point of the Augmented Lagrangian, by using an Alternating Direction of Multipliers Method (ADMM) iterations. The first sub problem is mathematically represented as:

$$\rho^{(k+1)} = \mathrm{argmin}D(\rho) + \frac{\mu}{2}\|\rho - \bar{\rho}^{(k)}\|_2^2 \tag{14}$$

The second sub problem is mathematically represented as:

$$\nu^{(k+1)} = \mathrm{argmin}\frac{2\lambda}{\mu}R(\nu) + \|\nu - \tilde{\nu}^{(k)}\|_2^2 \tag{15}$$

$$\bar{u}^{(k+1)} = \bar{u}^{(k)} + \left(\rho^{(k+1)} - \nu^{(k+1)}\right) \tag{16}$$

where $\bar{u}^{(k)} = \frac{1}{\mu}u^{(k)}$;

$\bar{\rho}^{(k)} = \nu^{(k)} - \bar{u}^{(k)}$;

$\tilde{\nu}^{(k)} = \rho^{(k+1)} + \bar{u}^{(k)}$; $\bar{u}^{(k+1)}$ is update step for u and, k denotes the iteration number.

At step 322, the one or more hardware processors 104 obtain, the plurality of reflectivities ($\rho$), by solving the first subproblem and the second subproblem, for reconstructing PPSAR image signals. The first sub problem (equation (14)) of the Augmented Lagrangian corresponding to the constrained optimization problem is solved using Wirtinger derivatives of the ADMM iterations. The initial estimate for WF is very important for its convergence and the initial estimate $\rho_0$ of the WF is selected by using a spectral method as described in in literature (e.g., "E. J. Candes, X. Li, and M. Soltanolkotabi, "Phase retrieval via wirtinger flow: Theory and algorithms," IEEE Transactions on Information Theory, vol. 61, no. 4, pp. 1985-2007, 2015"). A leading eigenvector of positive semi-definite matrix $Y=\Sigma_{m=1}^M d_m L_m L_m^H$ is chosen as the initial estimate. Further the update step for $\rho$ is given by:

$$\rho^{(j+1)} = \rho^{(j)} - \frac{\tau^{(j+1)}}{\|\rho0\|^2}\nabla J(\rho^{(j)}) \tag{17}$$

where $$J(\rho^{(j)}) = D(\rho^{(j)})) + \frac{\mu}{2}\|\rho(j) - \bar{\rho}^{(k)}\|_2^2$$

and its derivative is expressed as:

$$\nabla J(\rho^{(j)}) = \frac{1}{M}\sum_{m=1}^M \left(L_m^H \rho^{(j)}(\rho^{(j)})^H L_m - d_m\right)L_m L_m^H \rho^{(j)} + u(\rho^{(j)} - \bar{\rho}^{(k)}) \tag{18}$$

$\tau^{(j)}$ denotes the step size at the jth update.

The second sub problem (equation 15) of the Augmented Lagrangian corresponding to the constrained optimization problem is solved using Total Variation (TV) or Block-matching and 3D filtering (BM3D) denoiser or Deep Image prior (DIP) of the ADMM iterations, wherein the TV, the BM3D denoiser, the DIP are the regularizers (denoisers). The second sub problem can be viewed as a denoising operation. The second sub problem of the Augmented Lagrangian corresponding to the constrained optimization problem solving using the Total Variation (TV) denoiser is given by:

$$\nu^{(k+1)} = \mathrm{argmin}\frac{2\lambda}{\mu}\|\nu\|_{TV} + \|\nu - \tilde{\nu}^{(k)}\|_2^2 (rWF-TV) \tag{19}$$

where rWF-TV is the rWF based approach formulation with TV;
BM3D used as a denoiser with rWF based approach is referred as rWF-BM3D;
DIP used as a denoiser with rWF based approach is referred as rWF-DIP; and
the rWF-TV, the rWF-BM3D and, the rWF-DIP are called rWF based approaches.

For updating v, MATLAB implementations of the TV and the BM3D are used. Further, the DIP can also be used as a denoiser, to solve the second sub problem, which is an unlearned convolutional neural network (CNN) capable of solving inverse problems in a training-less setting. In the DIP, instead of using R($\rho$), architecture of the CNN works as an implicit prior with regularization by early stopping.

At step 324, the one or more hardware processors 104 obtain, a plurality of reconstructed Phaseless Passive Synthetic Aperture Radar (PPSAR) image signals from the obtained plurality of reflectivities.

Experimental Results

The system 100 and method of the present disclosure used simulation setting from "Unrolled wirtinger flow with deep priors for phaseless imaging," arXiv preprint arXiv: 2108.01735, 2021". The transmitter is located at [15, 15, 0.5] Km to transmit a Digital Video Broadcasting-Terrestrial (DVB-T) signal having a flat spectrum of bandwidth 8 MHz modulated with a carrier frequency of 760 MHz. This bandwidth provides a range resolution of around 20 m. Further a scene of [0, 420]×[0, 420]m² is discretized into small cells of size 21×21 for the 20 m resolution. SAR imaging system considered by the system 100 and method of the present disclosure moves along a circular trajectory path given by $\gamma(s)$=[10 cos (s), 10 sin (s), 6] Km.

Further, in all the simulation settings, the system 100 and method of the present disclosure fixes number of fast-time samples to 50 and vary the number of slow-time samples to change the number of measurements M. Taking 50 samples would amount to taking a fast-time measurement of duration 6.25 μsec at each slow time measurement interval by considering a uniform sampling rate of 8 MHz by the system 100 and method of the present disclosure. The mentioned simulation settings satisfy the far filed, small scene and start-stop approximations.

Figure 4:
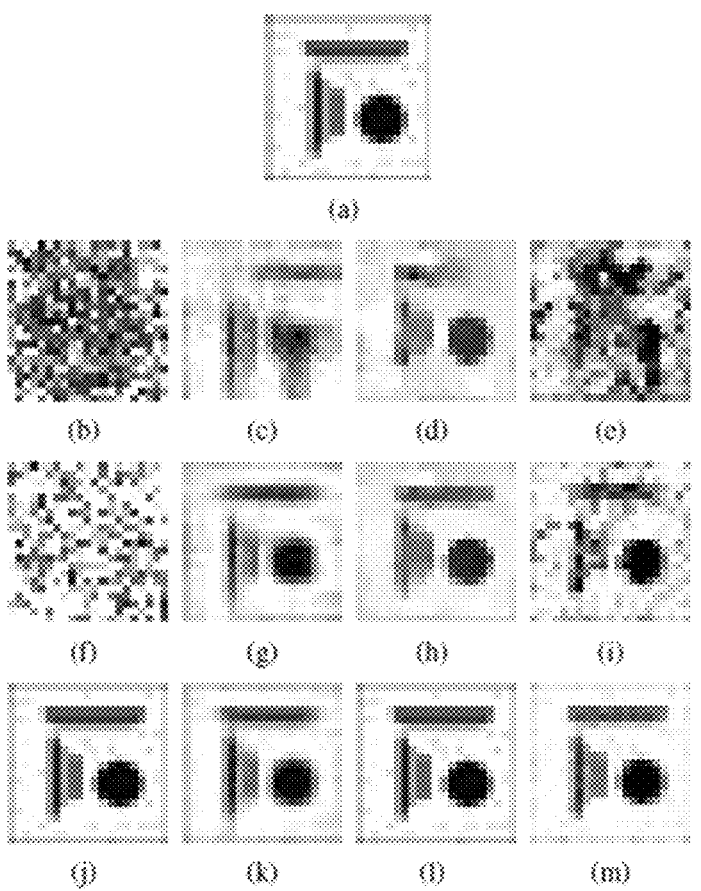
FIG. 4 illustrates PPSAR image reconstruction results of rWF-TV, rWF-BM3D and, rWF-DIP with vWF based approach, for synthetic image I, in accordance with some embodiments of the present disclosure.
Figure 5:
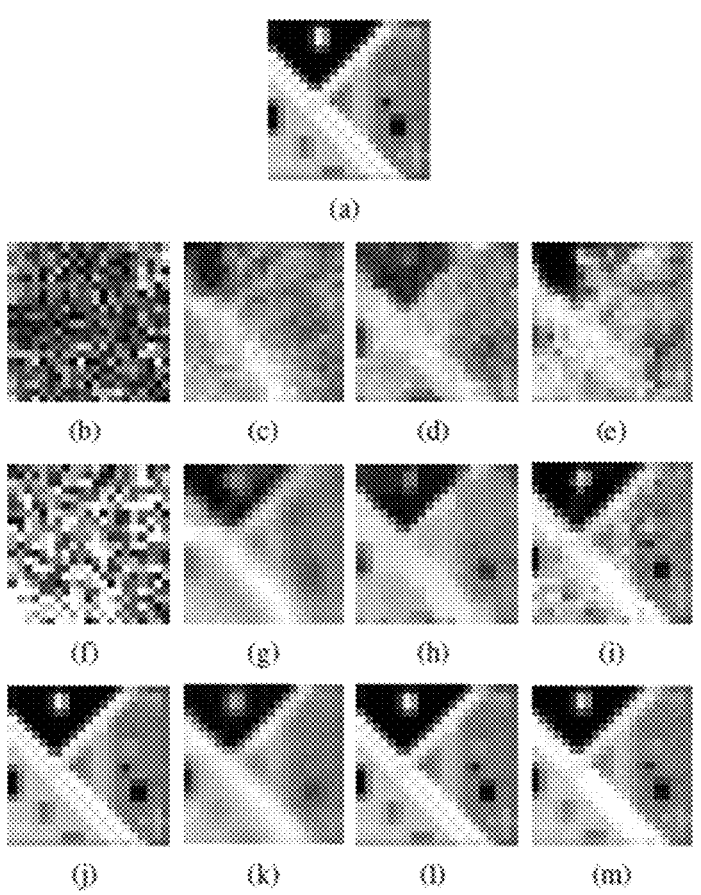
FIG. 5 illustrates PPSAR image reconstruction results of rWF-TV, rWF-BM3D and, rWF-DIP with vWF approach, for synthetic image II, in accordance with some embodiments of the present disclosure.

The system and method of the present disclosure have compared PPSAR image results of the rWF-TV, the rWF-BM3D and, the rWF-DIP. Further these results are compared with the existing vWF approach and LRMR based approach in "Passive phaseless sar imaging," in 2018 IEEE Radar Conference (RadarConf18). IEEE, 2018, pp. 0292-0297" and Reweighted Wirtinger Flow (RWF) methods in (e.g., "Z. Yuan and H. Wang, "Phase retrieval via reweighted wirtinger flow," Applied Optics, vol. 56, no. 9, p. 2418, March 2017."). For this the system and method of the present disclosure considers synthetic images from ("M. B. Alver, A. Saleem, and M. C. etin, "Plug-and-play synthetic aperture radar image formation using deep priors," IEEE Transactions on Computational Imaging, vol. 7, pp. 43-57, 2020."). Further the system and method of the present disclosure generates variation in M, by varying the number of slow-time samples. FIG. 4 and FIG. 5 show the PPSAR image reconstruction results of the rWF-TV, the rWF-BM3D and, the rWF-DIP with the vWF approach for M=500, 1000 and 6000 phaseless passive SAR measurements. More specifically, FIG. 4, with reference to FIG. 1, FIG. 2 and, FIG. 3, illustrates the PPSAR image reconstruction results of rWF-TV, the rWF-BM3D and, the rWF-DIP with the vWF based approach, for synthetic image I, in accordance with some embodiments of the present disclosure. More specifically, FIG. 5, with reference to FIG. 1, FIG. 2, and FIG. 3, illustrates the PPSAR image reconstruction results of rWF-TV, the rWF-BM3D and, the rWF-DIP with the vWF based approach, for synthetic image II, in accordance with some embodiments of the present disclosure. More specifically in FIG. 4 and FIG. 5, ground truth image for Radar image reconstruction results is represented in (a). A first column (images corresponding to (b), (f), (j)) in FIG. 4 and FIG. 5 represents the PPSAR image reconstruction results with respect to rWF based approach. The Radar image reconstruction results of the rWF-BM3D, the rWF-TV, the rWF-DIP, are represented in second column (images corresponding to (c), (g), (k)), third column (images corresponding to (d), (h), (i)) and, fourth column (images corresponding to (e), (i), (m)) respectively. More Specifically in FIG. 4 and FIG. 5, measurements M=500, 1000 and 6000 for first row, second row and, third row respectively. It is noticed from FIG. 4 and FIG. 5 that the proposed rWF based approaches of the present disclosure produces better quality PPSAR reconstruction images even with fewer measurements as compared with the vWF based approach. Among the rWF based approaches, the rWF-BM3D tends to produce slightly blurry images while the rWF-TV generates better resolved images. It is noticed/observed that the rWF-DIP also promotes better PPSAR image reconstruction results and gives performance comparable to that of rWF-TV over a certain range of values of M. However, the rWF-DIP performance of the rWF-DIP degrades when M is very small.

Figure 6:
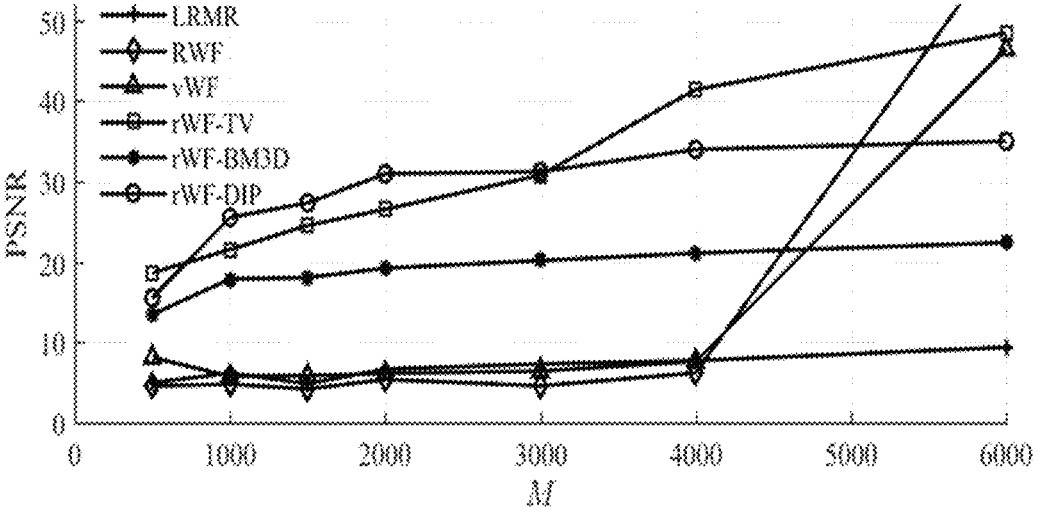
FIG. 6 illustrates a quantitative comparison between vWF based approach, LRMR based approach, RWF and rWF based approaches, in accordance with some embodiments of the present disclosure.

FIG. 6 illustrates a quantitative comparison between vWF based approach, LRMR based approach, Reweighted Wirtinger Flow (RWF) and rWF based approaches, in accordance with some embodiments of the present disclosure. From FIG. 6, it is noticed that the rWF-TV provides satisfactory PPSAR image reconstruction from M=1000 onwards and the Peak signal-to-noise ratio (PSNR) gradually improves with increase in the M. Further the rWF-BM3D and the rWF-DIP require slightly more samples to give satisfactory PSNR values. In case of the vWF based approach and the RWF, the improvement in the PSNR happens only after a large M. It is noticed, a significant performance gap between the vWF based approach and the rWF-TV/rWF-DIP between M=1000 to 4000. Further it is noticed that the LRMR based approach performs poorly than the vWF based approach and obviously the rWF based approach.

Figure 7:
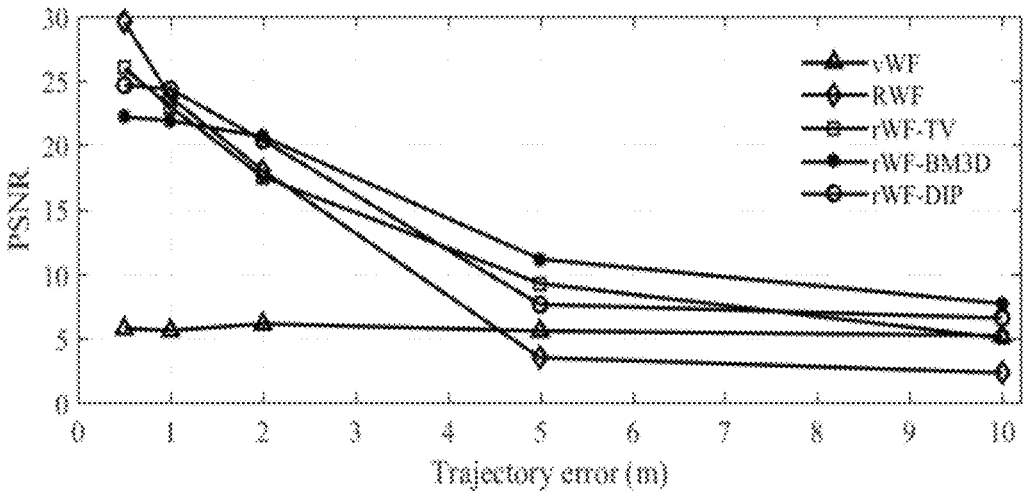
FIG. 7 illustrates a robustness comparison between vWF based approach, Reweighted Wirtinger Flow (RWF) and rWF based approaches, in accordance with some embodiments of the present disclosure.

Further the system 100 and method of the present disclosure compares the robustness of the rWF based approach, the vWF based approach and, the RWF, for trajectory errors. The system and method of the present disclosure have taken M=6000 for a fair comparison since all techniques perform fairly, as noticed in the FIG. 6, in accordance with some embodiments of the present disclosure. FIG. 7 shows the plot for PSNR vs trajectory error. More specially, FIG. 7 illustrates a robustness comparison between the vWF based approach, the RWF and the rWF based approaches, in accordance with some embodiments of the present disclosure, from which it is noticed that while all the approaches fail beyond 5 m, the RWF and the proposed rWF based approaches show better robustness at lower trajectory errors.

Experimental results clearly demonstrates that the proposed rWF based approaches provides improved PPSAR image reconstruction even with fewer measurements. In particular, the rWF-TV provides at least 75% reduction in number of measurements as compared to existing vWF based approaches for a similar performance. In addition to providing the significant reduction in number of measurements, the proposed rWF approaches also shows more robustness against trajectory errors, making it attractive for the PPSAR imaging.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The present disclosure herein addresses the PPSAR image reconstruction with rWF based approach. The proposed rWF based approach with a regularization term uses regularizers that facilitate the PPSAR reconstruction with fewer measurements. Further the proposed rWF based approach is also more robust to PPSAR trajectory errors when compared with the vWF based approaches. Further the proposed method represents the PPSAR imaging signals with respect to the actual location of the transmitter, by removing the far field and small scene approximations on the PPSAR imaging signals, enabling the PPSAR imaging signals becomes exact.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for Radio Detection And Ranging (Radar) image reconstruction, the method comprising:

transmitting, via a transmitter controlled by one or more hardware processors, a plurality of signal of opportunity, on to a scene of interest;

receiving, via a mobile receiver controlled by the one or more hardware processors, a plurality of Passive Synthetic Aperture Radar (PSAR) imaging signals back scattered from the scene of interest;

generating, a plurality of Fourier transform PSAR imaging signals, by representing, via one or more hardware processors, the plurality of PSAR imaging signals into frequency domain using a fast-time Fourier transform, by employing start-stop and born scattering approximations;

performing, an auto-correlation function, on to the plurality Fourier transform PSAR imaging signals, via the one or more hardware processors, to obtain a phaseless measurement data corresponding to the plurality of PSAR imaging signals;

representing, via the one or more hardware processors, the phaseless measurement data corresponding to each of the plurality of PSAR imaging signals with respect to an actual location of the transmitter;

discretizing, the scene of interest corresponding to the phaseless measurement data of each of the plurality of PSAR imaging signals, into a plurality of small cells (N), with a predefined frequency and measurement intervals, via the one or more hardware processors, to generate a discretized data;

formulating, via the one or more hardware processors, an optimization problem, for the discretized data, to estimate a plurality of reflectivities ($\rho$);

converting, via the one or more hardware processors, the optimization problem, to a constrained optimization problem, by using a variable splitting approach;

deriving, via the one or more hardware processors, an Augmented Lagrangian, corresponding to the constrained optimization problem;

dividing, via the one or more hardware processors, the Augmented Lagrangian corresponding to the constrained optimization problem into subproblems comprising a first sub problem and a second subproblem;

obtaining, via the one or more hardware processors, the plurality of reflectivities ($\rho$), by solving the first subproblem and the second subproblem; and obtaining, via the one or more hardware processors, a plurality of reconstructed Phaseless Passive Synthetic Aperture Radar (PPSAR) image signals from the obtained plurality of reflectivities.

2. The method of claim 1, wherein the phaseless measurement data corresponding to each of the plurality of PSAR imaging signals represented with respect to the actual location of the transmitter is mathematically represented as:

$$d(\omega,s)=\int\rho(x)e^{-i\omega(|y-x|+|x-y|/c}dx\times\int\rho(\tilde{x})e^{i\omega(|y-\tilde{x}|+|\tilde{x}-y|/c}d\tilde{x}$$

where x, $\tilde{x}$ are ground locations and y is the transmitter location, $\rho(x)$ is a ground reflectivity at any ground location x, $\rho(\tilde{x})$ is a ground reflectivity at any ground location $\tilde{x}$, c denotes propagation velocity of light;

$\omega$ is the frequency index; and s represents the slow-time index.

3. The method of claim 1, wherein the optimization problem, for the discretized data, is formulated with a regularized Wirtinger Flow (rWF) based approach, and is mathematically represented as:

$$\hat{\rho}=\text{argmin } D(\rho)+\lambda R(\rho)$$

where $D(\rho)$ is a data-fidelity term that is represented as a simple quadratic loss function, $R(\rho)$ represents the rWF regularization term of the rWF based approach, a hyper-parameter $\lambda$ that controls amount of regularization; and $\hat{\rho}$ is an optimal solution of the optimization problem.

4. The method of claim 1, wherein the optimization problem is converted to the constrained optimization problem using variable splitting approach, by introducing a proxy variable (v), and is mathematically represented as:

$$\{\hat{\rho}, \hat{v}\} = \underset{\rho,v}{\text{argmin}} D(\rho) + \lambda R(v) \text{ subject to } \rho = v.$$

5. The method of claim 1, wherein the first sub problem and the second sub problem are iteratively solved to calculate a saddle point of the Augmented Lagrangian, by using Alternating Direction of Multipliers Method (ADMM) iterations.

6. The method of claim 5, wherein the first sub problem is solved using Wirtinger derivatives of the ADMM iterations.

7. The method of claim 5, wherein the second sub problem is solved using one of Total Variation (TV), Block-matching and 3D filtering (BM3D) denoiser and Deep Image prior (DIP) of the ADMM iterations.

8. A system for Radio Detection And Ranging (Radar) image reconstruction, the method comprising:

a memory storing instructions;

one or more communication interfaces; and one or more hardware processors coupled to the memory via the one or more communication interfaces, wherein the one or more hardware processors are configured by the instructions to:

transmit a plurality of signal of opportunity on to a scene of interest via a transmitter;

receive a plurality of Passive Synthetic Aperture Radar (PSAR) imaging signals back scattered from the scene of interest via a mobile receiver;

generate a plurality of Fourier transform PSAR imaging signals by representing the plurality of PSAR imaging signals into frequency domain using a fast-time Fourier transform by employing start-stop and born scattering approximations;

perform an auto-correlation function on to the plurality Fourier transform PSAR imaging signals to obtain a phaseless measurement data corresponding to the plurality of PSAR imaging signals;

represent the phaseless measurement data corresponding to each of the plurality of PSAR imaging signals with respect to an actual location of the transmitter;

discretize the scene of interest corresponding to the phaseless measurement data of each of the plurality of PSAR imaging signals into a plurality of small cells with a predefined frequency and measurement intervals to generate a discretized data;

formulate an optimization problem for the discretized data to estimate a plurality of reflectivities ($\rho$);

convert an optimization problem to a constrained optimization problem by using variable splitting approach;

derive an Augmented Lagrangian, corresponding to the constrained optimization problem;

divide Augmented Lagrangian corresponding to the constrained optimization problem into subproblems as a first sub problem and a second subproblem;

obtain the plurality of reflectivities ($\rho$) by solving the first subproblem and the second subproblem; and obtain a plurality of reconstructed Phaseless Passive Synthetic Aperture Radar (PPSAR) image signals from the obtained plurality of reflectivities.

9. The system of claim 8, wherein the phaseless measurement data corresponding to each of the plurality of PSAR imaging signals represented with respect to the actual location of the transmitter is mathematically represented as:

$$d(\omega, s) = \int \rho(x)e^{-\frac{i\omega(|y-x|+|x-\gamma)}{c}}dx \times \int \rho(\tilde{x})e^{\frac{i\omega(|y-\tilde{x}-|+|\tilde{x}-\gamma)}{c}}d\tilde{x}$$

where x, $\tilde{x}$ are ground locations and y is the transmitter location $\rho(x)$ is a ground reflectivity at any ground location x, $\rho(\tilde{x})$ is a ground reflectivity at any ground location $\tilde{x}$;

c denotes propagation velocity of light;

$\omega$ is the frequency index; and s represents the slow-time index.

10. The system of claim 8, wherein the optimization problem, for the discretized data, is formulated with a regularized Wirtinger Flow (rWF) based approach, and mathematically represented as:

$$\hat{\rho}=\text{argmin } D(\rho)+\lambda R(\rho)$$

where $D(\rho)$ is a data-fidelity term that is represented as a simple quadratic loss function; $R(\rho)$ represents the rWF regularization term of the rWF based approach, a hyper-parameter $\lambda$ that controls amount of regularization; and and $\hat{\rho}$ is an optimal solution of the optimization problem.

11. The system of claim 8, wherein the optimization problem is converted to the constrained optimization problem using variable splitting approach, by introducing a proxy variable (v), and is mathematically represented as:

$$\{\hat{\rho}, \hat{v}\} = \underset{\rho,v}{\text{argmin}}D(\rho) + \lambda R(v) \text{ subject to } \rho = v.$$

12. The system of claim 8, wherein the first sub problem and the second sub problem, are iteratively solved to calculate a saddle point of the Augmented Lagrangian, by using Alternating Direction of Multipliers Method (ADMM) iterations.

13. The system of claim 12, wherein the first sub problem is solved using wirtinger derivatives of the ADMM iterations.

14. The system of claim 12, wherein the second sub problem is solved using one of Total Variation (TV), Block-matching and 3D filtering (BM3D) denoiser, and Deep Image prior (DIP) of the ADMM iterations.

15. One or more non-transitory machine-readable information storage mediums comprising one or more instructions which when executed by one or more hardware processors cause:

transmitting, via a transmitter, a plurality of signal of opportunity, on to a scene of interest;

receiving, via a mobile receiver, a plurality of Passive Synthetic Aperture Radar (PSAR) imaging signals back scattered from the scene of interest;

generating, a plurality of Fourier transform PSAR imaging signals, by representing, the plurality of PSAR imaging signals into frequency domain using a fast-time Fourier transform, by employing start-stop and born scattering approximations;

performing, an auto-correlation function, on to the plurality Fourier transform PSAR imaging signals, to obtain a phaseless measurement data corresponding to the plurality of PSAR imaging signals;

representing, the phaseless measurement data corresponding to each of the plurality of PSAR imaging signals with respect to an actual location of the transmitter;

discretizing, the scene of interest corresponding to the phaseless measurement data of each of the plurality of PSAR imaging signals, into a plurality of small cells (N), with a predefined frequency and measurement intervals, to generate a discretized data;

formulating, an optimization problem, for the discretized data, to estimate a plurality of reflectivities ($\rho$);

converting, the optimization problem, to a constrained optimization problem, by using a variable splitting approach;

deriving, an Augmented Lagrangian, corresponding to the constrained optimization problem;

dividing, the Augmented Lagrangian corresponding to the constrained optimization problem into subproblems comprising a first sub problem and a second subproblem;

obtaining, the plurality of reflectivities ($\rho$), by solving the first subproblem and the second subproblem; and obtaining, a plurality of reconstructed Phaseless Passive Synthetic Aperture Radar (PPSAR) image signals from the obtained plurality of reflectivities.

16. The one or more non-transitory machine-readable information storage mediums of claim 15, wherein the phaseless measurement data corresponding to each of the plurality of PSAR imaging signals represented with respect to the actual location of the transmitter is mathematically represented as:

$$d(\omega,s)=\int \rho(x)e^{-i\omega(|y-x|+|x-\gamma|)/c}dx \times \int \rho(\tilde{x})e^{i\omega(|y-\tilde{x}|+|\tilde{x}-\gamma|)/c}d\tilde{x}$$

where x, $\tilde{x}$ are ground locations and y is the transmitter location, $\rho(x)$ is a ground reflectivity at any ground location x, $\rho(\tilde{x})$ is a ground reflectivity at any ground location $\tilde{x}$, c denotes propagation velocity of light;

$\omega$ is the frequency index; and s represents the slow-time index.

17. The one or more non-transitory machine-readable information storage mediums of claim 15, wherein the optimization problem, for the discretized data, is formulated with a regularized Wirtinger Flow (rWF) based approach, and is mathematically represented as:

$$\hat{\rho}=\text{argmin } D(\rho)+\lambda R(\rho)$$

where $D(\rho)$ is a data-fidelity term that is represented as a simple quadratic loss function, $R(\rho)$ represents the rWF regularization term of the rWF based approach, a hyper-parameter $\lambda$ that controls amount of regularization; and $\hat{\rho}$ is an optimal solution of the optimization problem.

18. The one or more non-transitory machine-readable information storage mediums of claim 15, wherein the optimization problem is converted to the constrained optimization problem using variable splitting approach, by introducing a proxy variable (v), and is mathematically represented as:

$$\{\hat{\rho}, \hat{v}\} = \underset{\rho,v}{\text{argmin}}D(\rho) + \lambda R(v) \text{ subject to } \rho = v.$$

19. The one or more non-transitory machine-readable information storage mediums of claim 15, wherein the first sub problem and the second sub problem are iteratively solved to calculate a saddle point of the Augmented Lagrangian, by using Alternating Direction of Multipliers Method (ADMM) iterations.

20. The one or more non-transitory machine-readable information storage mediums of claim 19, wherein the first sub problem is solved using Wirtinger derivatives of the ADMM iterations, and wherein the second sub problem is solved using one of Total Variation (TV), Block-matching and 3D filtering (BM3D) denoiser and Deep Image prior (DIP) of the ADMM iterations.

* * * * *